United States Patent
Toda et al.

(10) Patent No.: US 10,694,858 B2
(45) Date of Patent: Jun. 30, 2020

(54) AIR CONDITIONING SEAT

(71) Applicant: TOYOTA BOSHOKU KABUSHIKI KAISHA, Aichi-ken (JP)

(72) Inventors: Keisuke Toda, Aichi-ken (JP); Fumitoshi Akaike, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 1 day.

(21) Appl. No.: 16/180,581

(22) Filed: Nov. 5, 2018

(65) Prior Publication Data
US 2019/0142172 A1    May 16, 2019

(30) Foreign Application Priority Data
Nov. 10, 2017 (JP) ................... 2017-217133

(51) Int. Cl.
*A47C 7/74* (2006.01)
*B60H 1/00* (2006.01)
*B60N 2/879* (2018.01)
*B60N 2/56* (2006.01)

(52) U.S. Cl.
CPC .............. *A47C 7/744* (2013.01); *A47C 7/748* (2013.01); *B60H 1/00285* (2013.01); *B60N 2/5657* (2013.01); *B60N 2/879* (2018.02)

(58) Field of Classification Search
None
See application file for complete search history.

(56) References Cited

U.S. PATENT DOCUMENTS

| 5,450,894 A * | 9/1995 | Inoue | B60H 1/00664 165/43 |
| 9,975,394 B2 * | 5/2018 | Fitzpatrick | B60H 1/00285 |
| 2006/0290176 A1 * | 12/2006 | Aoki | B60N 2/5628 297/180.1 |
| 2009/0015043 A1 * | 1/2009 | Macht | B60H 1/00285 297/180.14 |
| 2011/0109128 A1 * | 5/2011 | Axakov | A47C 7/744 297/180.1 |
| 2012/0003909 A1 * | 1/2012 | Efthymiou | B60H 1/00507 454/120 |
| 2015/0274047 A1 * | 10/2015 | Ise | B60N 2/5635 297/180.14 |

(Continued)

FOREIGN PATENT DOCUMENTS

JP    2013-112100    6/2013

*Primary Examiner* — David E Allred
(74) *Attorney, Agent, or Firm* — Greenblum & Bernstein, P.L.C.

(57) ABSTRACT

An air conditioning seat including: a blowing path through which air is blown out from a seat surface, the blowing path including a panel member, the panel member including: an air distribution plate portion which has a vertical plate shape, extends to project from a seat side portion to a seat surface side, and in which air flows along an inner side surface thereof in a seat width direction, and a bent plate portion which is bent inward in the seat width direction from a part of the air distribution plate portion which projects further than a seat top surface, and which is configured to discharge the air flowing toward the seat surface side along the air distribution plate portion by bending the air inward in the seat width direction.

8 Claims, 8 Drawing Sheets

(56) References Cited

U.S. PATENT DOCUMENTS

| | | | |
|---|---|---|---|
| 2015/0329028 A1* | 11/2015 | Ogino | B60N 2/5685 |
| | | | 297/180.14 |
| 2016/0250956 A1* | 9/2016 | Seiting | B60N 2/5657 |
| | | | 297/180.14 |
| 2016/0272038 A1* | 9/2016 | Tanaka | B60N 2/5657 |
| 2016/0288612 A1* | 10/2016 | Fujii | B60N 2/5628 |
| 2018/0361891 A1* | 12/2018 | Kato | B60N 2/5628 |
| 2020/0039397 A1* | 2/2020 | Shiga | B60N 2/5657 |

* cited by examiner

AIR CONDITIONING SEAT

CROSS-REFERENCE TO RELATED APPLICATIONS

This application claims priority from Japanese Patent Application No. 2017-217133 filed on Nov. 10, 2017, the entire contents of which are incorporated herein by reference.

TECHNICAL FIELD

The present disclosure relates to an air conditioning seat and in particular to an air conditioning seat including a blowing path through which air is blown out from a seat surface.

BACKGROUND

There is known a so-called air conditioning seat having an air blowing function so as to improve comfort of a seated person by blowing air out from a seat surface (JP-A-2013-112100). Specifically, a duct which is configured such that air can flow inside the seat is set and the air passing through the duct is blown out from an outlet that is set on the seat surface.

In the related art, in order to spread the air blown from the duct to a wide range and blow the air out, it is necessary to widen an air distribution path by changing a shape of the duct into a wide shape or branching the duct shape into a plurality of portions, and moreover it is necessary to devise a way of causing the air to spread throughout the widely distributed air distribution path.

SUMMARY

The disclosure has been made to solve the above problem, and the problem to be solved by the disclosure is to widely spread the air to be blown out from the seat surface by a simple configuration.

According to an aspect of the disclosure, there is provided an air conditioning seat including a blowing path through which air is blown out from a seat surface, the blowing path including a panel member, the panel member, including: an air distribution plate portion which has a vertical plate shape, extends to project from a seat side portion to a seat surface side, and in which air flows along an inner side surface thereof in a seat width direction, and a bent plate portion which is bent inward in the seat width direction from a part of the air distribution plate portion which projects further than a seat top surface, and which is configured to discharge the air flowing toward the seat surface side along the air distribution plate portion by bending the air inward in the seat width direction.

According to the aspect of the disclosure, with a simple configuration in which a panel member projecting from the seat side portion is provided, the air flows toward the seat surface side while widely spreading along the inner side surface of the air distribution plate portion of the panel member, and the flowing air can be blown inward in the seat width direction toward a body side of a seated person by the bent plate portion of the panel member.

DETAILED DESCRIPTION

Hereinafter, embodiments for implementing the present disclosure will be described with reference to the drawings.

First Embodiment

Schematic Configuration of Air Conditioning Seat 1

First, a configuration of an air conditioning seat 1 according to a first embodiment will be described with reference to FIGS. 1 to 5. In the following description, directions such as front, rear, upper, lower, left and right directions refer to directions shown in each drawing separately. Further, a "seat width direction" refers to a left-right direction of the air conditioning seat 1.

Figure 1:
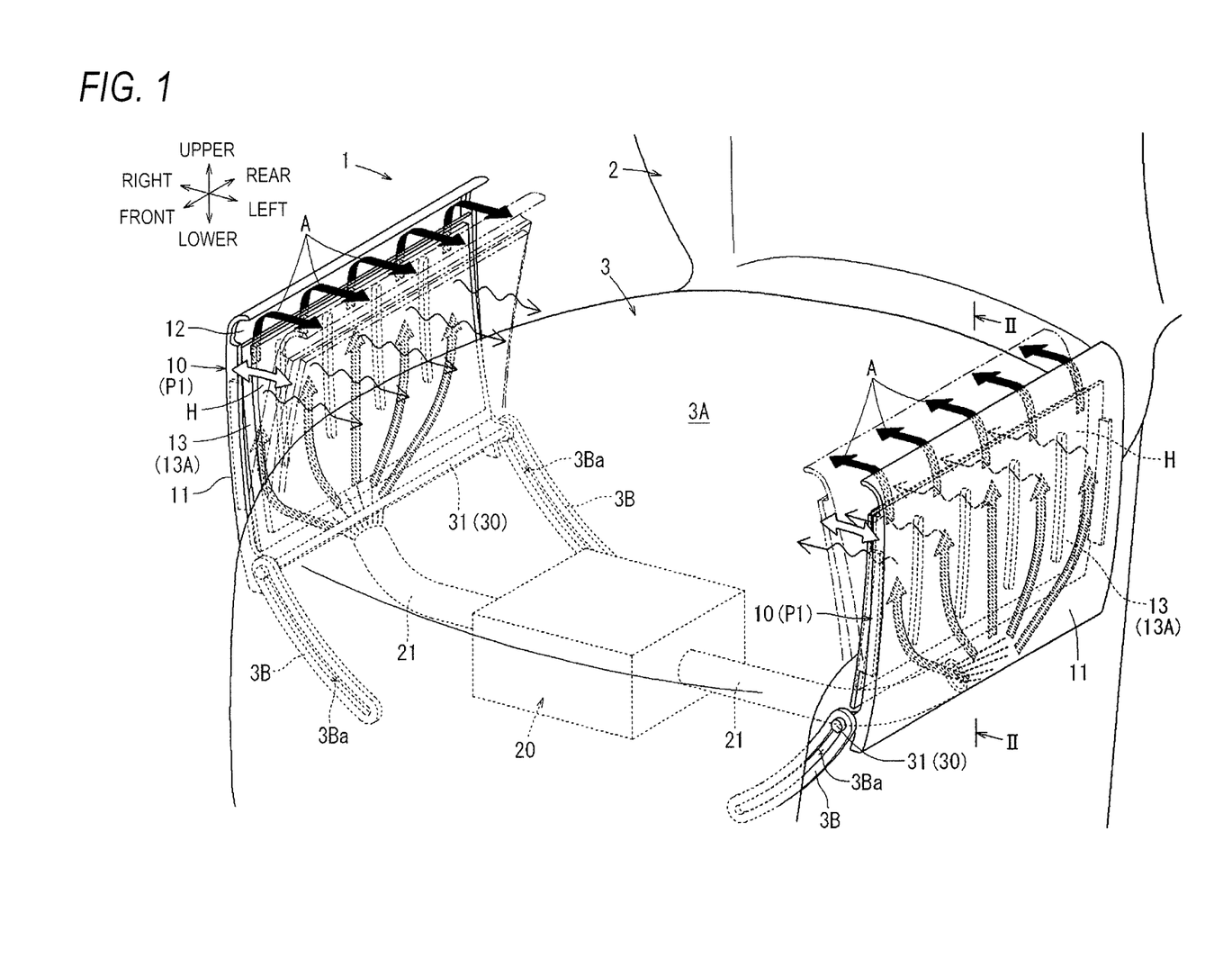
FIG. 1 is a perspective view showing a schematic configuration of an air conditioning seat according to a first embodiment.

As shown in FIG. 1, the air conditioning seat 1 of the present embodiment is configured as a rear seat of an automobile. The air conditioning seat 1 includes a seat back 2 serving as a backrest portion of a seated person, and a seat cushion 3 serving as a seating portion.

Figure 2:
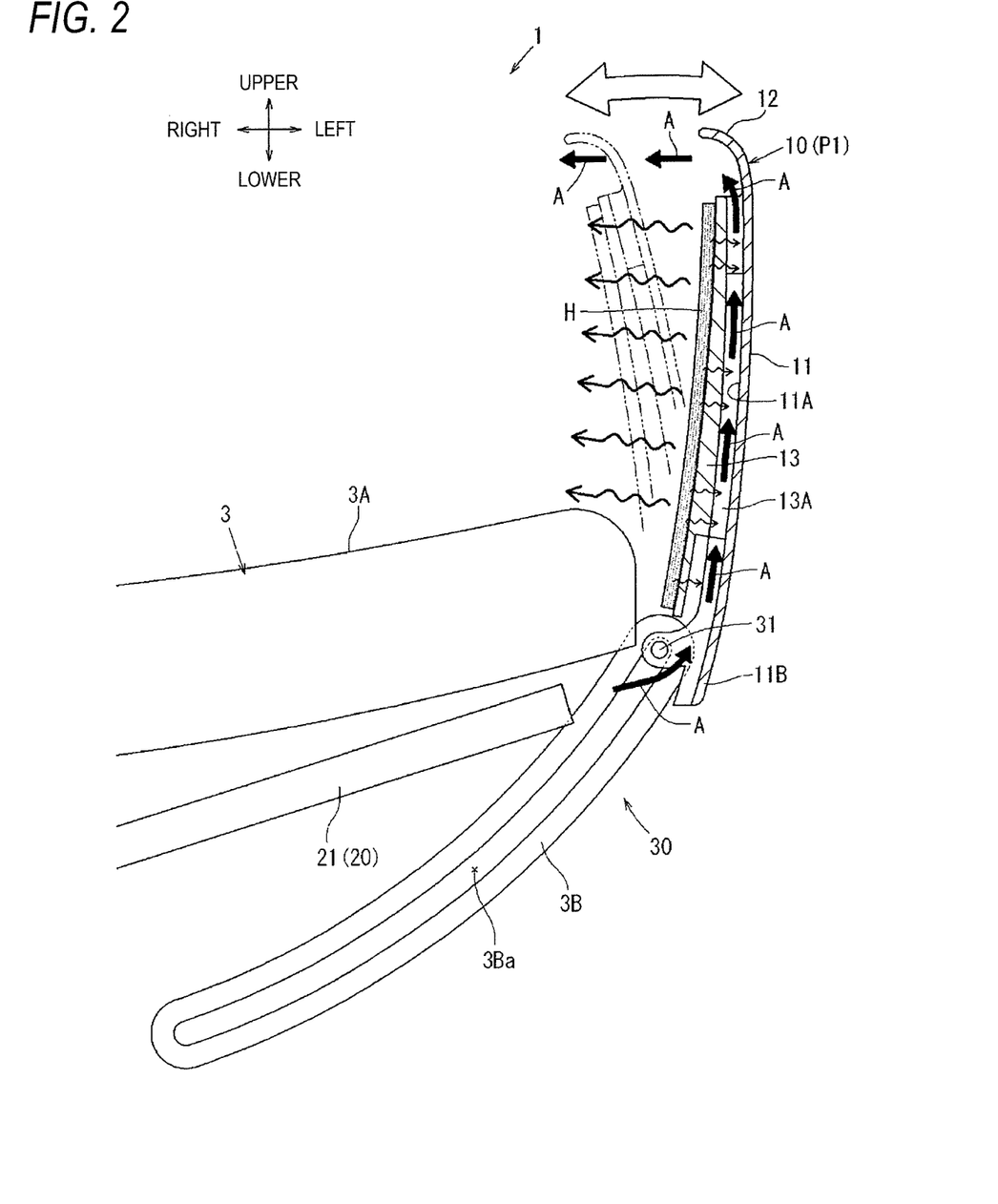
FIG. 2 is a cross-sectional view taken along a line II-II of FIG. 1.

As shown in FIGS. 1 and 2, movable panel members 10 which project in a vertical plate shape are provided on both side portions of seat cushion 3 that serve as seat side portions of the seat cushion 3, in the seat width direction thereof. Each panel member 10 is configured such that air A sent out from an air conditioning device 20 provided below the seat cushion 3 is blown to a seat upper side (seat surface side) along an inner side surface in the seat width direction of the panel member 10, and further, such that the air is blown out laterally toward thighs of a seated person via a shape bent inward in the seat width direction on an upper edge side of the panel member 10.

The panel members 10 are configured such that positions thereof can be adjusted with rising angles from the each side portion of the seat cushion 3 being synchronous and symmetrical with each other by a movable mechanism 30 to be described later. Specifically, distances between the panel members 10 in the seat width direction can be adjusted in such a manner that the panel members 10 are brought close to an inner side in the seat width direction or separated to an outer side in the seat width direction around a rotation shaft 31 extending in a seat front-rear direction by the movable mechanism 30.

With the above position adjustment, in a case where the seated person has a large physique, each panel member 10 is rotated to the outer side in the seat width direction so as to widen the distance in the seat width direction between each other and a blowing direction of the air A is directed upward, so that the air A can be blown out in an appropriate direction along a body surface of the thighs or the like without giving a constriction feeling to the seated person. Further, in a case where the seated person has a small physique, each panel member 10 is rotated to the inner side in the seat width direction so as to narrow the distance in the seat width direction between each other and the blowing direction of the air A is directed downward, so that the air A can be blown out in an appropriate direction along a body surface of the thighs or the like while arranging each panel member 10 in an appropriate position according to the physique thereof, which makes it less likely for the seated person to feel constricted.

Figure 3:
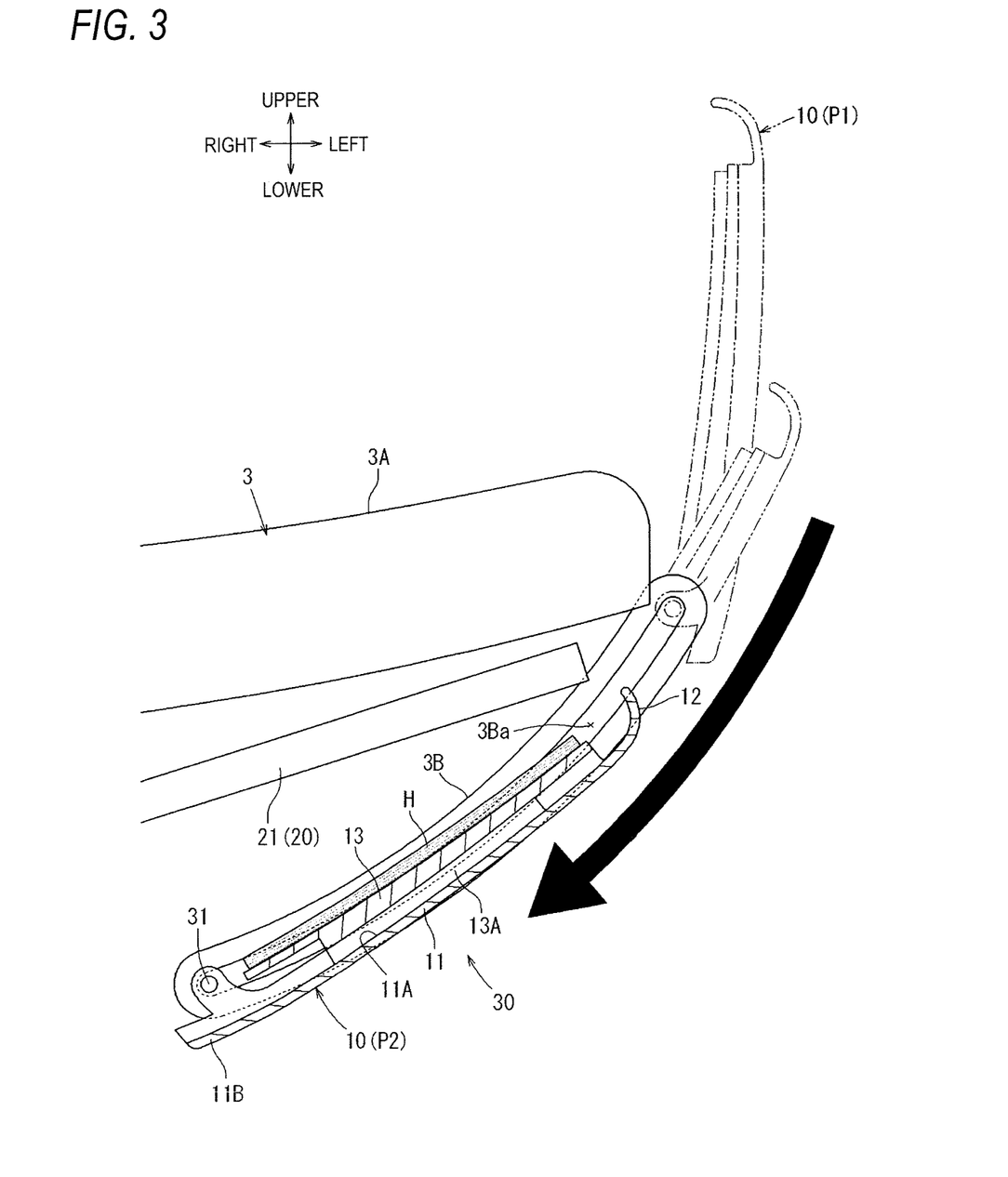
FIG. 3 is a cross-sectional view showing a state where each panel member is retracted to a storage position.

As shown in FIG. 3, when not in use, each panel member 10 can be moved from a use position P1 where each panel member 10 projects upper than a top surface 3A (seat top surface) of the seat cushion 3 to a storage position P2 where each panel member 10 is retreated below the top surface 3A by the movable mechanism 30. With the above storage, when not in use, each panel member 10 can be out of the way when a person gets on and off or stretches out his/her feet. Here, the movable mechanism 30 corresponds to the "position adjustment mechanism" and the "storage mechanism" of the disclosure.

Configuration of Panel Member 10

Figure 4:
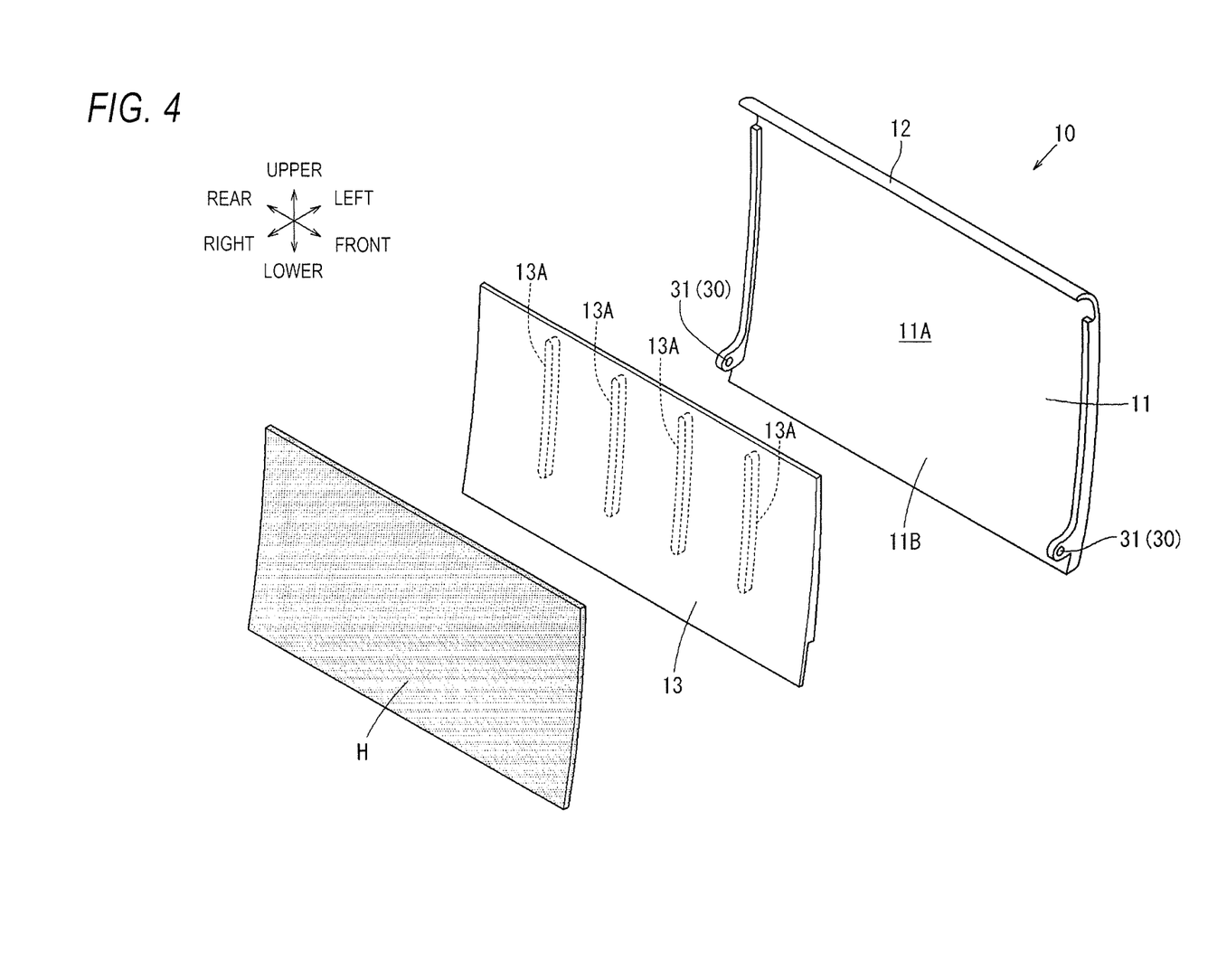
FIG. 4 is an exploded perspective view of a single panel member.

Hereinafter, configurations of each panel member 10 and the movable mechanism 30 that moves the panel members 10 will be described in detail. First, a configuration of each panel member 10 will be described. Since structures of the panel members 10 are symmetrical to each other in the left and right, the configuration of one panel member will be described as an example below. As shown in FIG. 4, each panel member 10 includes a flat plate-shaped air distribution plate portion 11 that extends substantially straight in a seat height direction, a bent plate portion 12 that extends from an upper edge part of the air distribution plate portion 11 toward the inner side in the seat width direction to form a curved shape, and a flat plate-shaped facing plate portion 13 that is attached to face the air distribution plate portion 11 from the inner side in the seat width direction.

As shown in FIG. 2, the air distribution plate portion 11 is configured such that the air A is blown from a lower side to an upper side along an inner side surface 11A which faces the facing plate portion 13 in the seat width direction. Specifically, front and rear ends of the air distribution plate portion 11 in the vicinity of an lower end thereof are rotatably and axially coupled to brackets 3B that extend from side frames (not shown) of the seat cushion 3 by the rotation shaft 31 which configures the movable mechanism 30 to be described later and extends in the seat front-rear direction. With the above coupling, the air distribution plate portion 11 is formed to include an extension 11B in which the inner side surface 11A thereof extends lower than the coupling position of the rotation shaft 31.

The air distribution plate portion 11 is configured such that the air A sent out from the air conditioning device 20 provided below the seat cushion 3 through a duct 21 is blown against the inner side surface 11A of the extension 11B that extends lower than the coupling position of the rotation shaft 31, from the inner side in the seat width direction. Further, in the air distribution plate portion 11, the air A blown against the inner side surface 11A of the extension 11B is blown in an out-of-plane direction of the inner side surface 11A, and therefore the air A gradually flows from a lower side to an upper side along the inner side surface 11A while widely spreading in an in-plane direction of the inner side surface 11A (a seat front-rear direction).

Specifically, the duct 21 connected to the air conditioning device 20 is not in contact with the inner side surface 11A of the air distribution plate portion 11, and is configured to make the air A blown out toward the inner side surface 11A of the air distribution plate portion 11 in an out-of-plane direction at an angle inclined slightly upward from a position spaced inward in the seat width direction from the inner side surface 11A. The direction of the duct 21 is fixed in the present embodiment, but the direction may be changed according to the rotation of the panel member 10.

As shown in FIG. 2, when the panel member 10 is at the use position P1, the bent plate portion 12 protrudes to a position upper than the top surface 3A of the seat cushion 3, and bends the air A flowing upward along the inner side surface 11A of the air distribution plate portion 11 inward in the seat width direction from a position upper than the top surface 3A of the seat cushion 3 so as to discharge the air. The bent plate portion 12 is bent inward in the seat width direction to form a curved shape, so that the air A flowing upward along the inner side surface 11A of the air distribution plate portion 11 can be smoothly bent inward in the seat width direction by substantially 90 degrees so as to be discharged. Specifically, due to the action of flow path resistance accompanying the bending of the bent plate portion 12, the air A flowing upward along the inner side surface 11A of the air distribution plate portion 11 can be discharged to the inner side in the seat width direction while spreading in the seat front-rear direction which is the in-plane direction of the inner side surface 11A.

Figure 5:
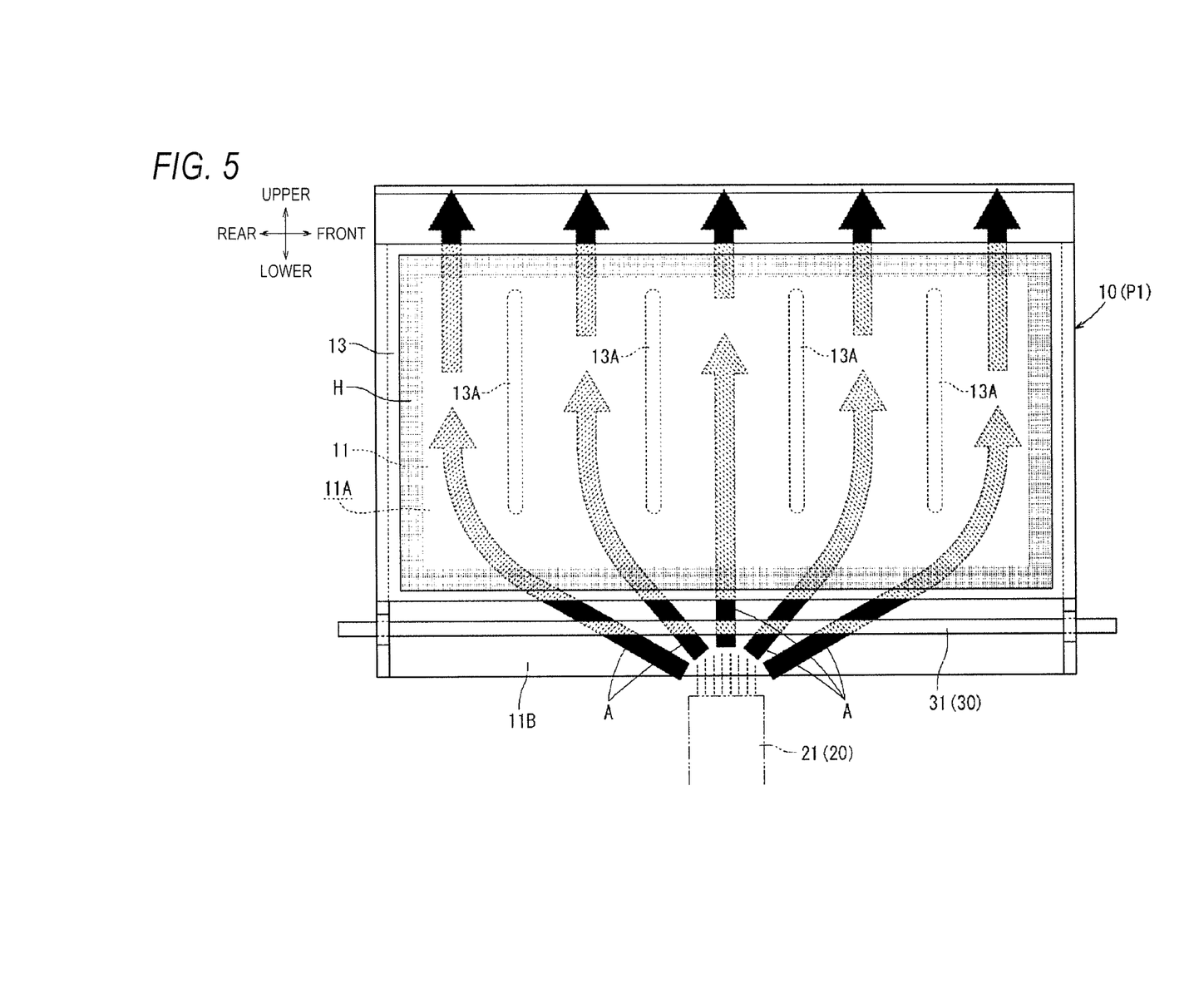
FIG. 5 is a side view of a single panel member.

As shown in FIG. 4, the facing plate portion 13 is assembled to face the inner side surface 11A of the air distribution plate portion 11. Specifically, a plurality of partitions 13A are formed to protrude in a streak form from a plurality of positions of the facing plate portion 13 on the outer side surface thereof facing the air distribution plate portion 11, and each partition 13A is adhered to a position abutting with the inner side surface 11A of the air distribution plate portion 11, so that the partition 13A is integrally assembled to the inner side surface 11A of the air distribution plate portion 11. As shown in FIG. 5, each partition 13A protrudes in a form of extending in a streak shape in the seat height direction from a plurality of positions in the seat front-rear direction on an outer side surface of the facing plate portion 13.

Since the facing plate portion 13 configured as above is provided to face the inner side surface 11A of the air distribution plate portion 11, the air A flowing from the lower side to the upper side along the inner side surface 11A of the air distribution plate portion 11 is properly blown upward without leaking to the inner side in the seat width direction by the pressing by an attachment plate portion. Specifically, a flow path of the air A blown from the lower side to the upper side between the air distribution plate portion 11 and the facing plate portion 13 along the inner side surface 11A of the air distribution plate portion 11 is partitioned into a plurality of flow paths aligned in the seat front-rear direction by the plurality of partitions 13A formed on the facing plate portion 13, so that the air A flowing through the partitioned flow paths is guided to flow upward appropriately according to shape guidance of each of these partitioned flow paths.

More specifically, each partition 13A is formed only in an intermediate region in the seat height direction leaving a lower end side region and an upper end side region of the facing plate portion 13. With the above configuration, in the lower end side region in which the partition 13A are not formed, the facing plate portion 13 functions to spread the air A, flowing between the facing plate portion 13 and the inner side surface 11A of the air distribution plate portion 11 facing therewith, widely in the seat front-rear direction (in-plane direction). Further, in the intermediate region in which the partitions 13A are formed, the facing plate portion 13 functions to straighten the air A flowing between the facing plate portion 13 and the inner side surface 11A of the air distributing plate portion 11 facing therewith upward by the partitioning of each partition 13A so as to make the air A flow upward.

As shown in FIGS. 2 and 5, the facing plate portion 13 is provided to face a region upper than the extension 11B of the air distribution plate portion 11, so as not to obstruct blowing of the air A from the duct 21 against the extension 11B of the air distribution plate portion 11 as described with reference to FIG. 2.

As shown in FIGS. 2 and 4, a planar panel heater H capable of radiating heat to the outside is attached on an inner side surface in the seat width direction of the facing plate portion 13. With the panel heater H, comfortable warm heat can be applied to left and right thighs of the seated person to which the facing plate portion 13 faces from the outer side in the seat width direction, from both outer sides thereof by radiant heat. Further, the heat released from the panel heater H is also transmitted to the air A flowing between the panel heater H and the air distribution plate portion 11, and the heat of the panel heater H can also be applied toward the seated person by the air A blown out from the bent plate portion 12 of the panel member 10. Here, the panel heater H corresponds to a "heat source" of the present disclosure.

Therefore, since the position of the panel member 10 to which the panel heater H is attached can be adjusted by the movable mechanism 30 as described above with reference to FIG. 2, strength of the heat applied from the panel heater H can also be adjusted. In the panel member 10, in fact, a pad member made of urethane foam (not shown) is placed on a region on the inner side in the seat width direction of the facing plate portion 13, and further, a cover member made of fabric (not shown) covering the pad member from a front side thereof (inner side in the seat width direction) is placed. With the above configuration, the panel member 10 is configured such that a surface portion to be in contact with the body of the seated person is brought into contact with the body of the seated person elastically and softly by the pad member (not shown), and the panel member is finished to have a good appearance by the cover member (not shown). Further, the panel heater H is brought into contact with the body of the seated person at a comfortable warm temperature via the pad member (not shown) and the cover member (not shown) without being in direct contact with the body of the seated person.

Configuration of Movable Mechanism 30

The movable mechanism 30 includes rotation shafts 31 through which each panel member 10 described with reference to FIG. 2 is rotatably and axially coupled to each bracket 3B extending from each side frame (not shown) of the seat cushion 3, and a drive unit (not shown) is connected to the rotation shafts 31. Specifically, each rotation shaft 31 is in a direction of an axis extending straight in the seat front-rear direction, and is integrally connected and attached to each front and rear end portions of each corresponding panel member 10. Further, each rotation shaft 31 passes through each elongated hole 3Ba. penetratingly formed in each corresponding bracket 3B, in the seat front-rear direction and is assembled to each bracket 3B such that the position thereof in each elongated hole 3Ba can be slidably adjusted by the drive unit (not shown).

Each elongated hole 3Ba is formed in a hole shape extending obliquely outward and upward in the seat width direction from a lower end side position on a back surface side of the seat cushion 3. By moving each rotation shaft 31 to an upper end side position of each elongated hole 3Ba as shown in FIG. 2, the movable mechanism 30 configured as above is set to the use position P1 where each panel member 10 projects upper than the top surface 3A of the seat cushion 3, and by moving each rotation shaft 31 to a lower end side position of each elongated hole 3Ba as shown in FIG. 3, the movable mechanism 30 is set to a storage position P2 where each panel member 10 is retracted below the top surface 3A of the seat cushion 3. In the movable mechanism 30, when each rotation shaft 31 is moved between the upper end side position and the lower end side portion of each elongated hole 3Ba, each panel member 10 can be moved in a space-saving manner along a side surface shape of the seat cushion 3, and each rotation shaft 31 is slid along the shape of each elongated hole 3Ba while being rotated appropriately.

Further, the movable mechanism 30 can be adjusted to suppress a projection amount of each panel member 10 from the top surface 3A of the seat cushion 3 by retracting each rotation shafts 31 from the upper end side position to a midway position in each elongated hole 3Ba. With the above adjustment, a blowing position of the air A from each panel member 10 can be lowered without moving away or approaching in the seat width direction, so that the blowing out position of the air A can be adjusted with a higher degree of freedom.

SUMMARY

In summary, the air conditioning seat 1 of the present embodiment has the following configuration. That is, an air conditioning seat (1) includes: a blowing path through which air (A) is blown out from a seat surface. The blowing path includes a panel member (10). The panel member (10) includes: an air distribution plate portion (11) which has a vertical plate shape, extends to project from a seat side portion to a seat surface side, and in which the (A) flows along an inner side surface (11A) thereof in a seat width direction, and a bent plate portion (12) which is bent inward in the seat width direction from a part of the air distribution plate portion (11) which projects further than a seat top surface (3A), and which is configured to discharge the air (A) flowing toward the seat surface side along the air distribution plate portion (11) by bending the air inward in the seat width direction.

Thus, with a simple configuration in which the panel member (10) projecting from the seat side portion is provided the air (A) flows toward the seat surface side while widely spreading along the inner side surface (11A) of the air distribution plate portion (11) of the panel member (10), and the flowing air (A) can be blown inward in the seat width direction toward a body side of a seated person by the bent plate portion (12) of the panel member (10).

Further, the air conditioning seat (1) further includes a duct (21) which is configured such that the air (A) is blown from a position spaced from the inner side surface (11A) in the seat width direction of the air distribution plate portion (11), the air flowing in an out-of-plane direction of the inner side surface (11A) against the inner side surface (11A). With such a configuration, the air (A) blown from the duct (21) toward the inner side surface (11A) of the air distribution plate portion (11) flows along the inner side surface (11A) of the air distribution plate portion (11) so as to spread widely in an in-plane direction of the inner side surface. Further, since the duct (21) is not connected to the panel member (10), a simple configuration in which it is unnecessary to provide a structure that absorbs a change in arrangement position of the panel member (10) with respect to the duct (21) can be obtained.

The air conditioning seat (1) further includes a position adjustment mechanism (30) which is configured to adjust an arrangement position of the panel member (10) in the seat width direction with respect to the seat side portion. With such a configuration, the arrangement position of the panel member (10) can be freely adjusted in the seat width direction according to physique differences, air (A) strength preference, or the like of the seated person by the position adjustment mechanism (30).

The position adjustment mechanism (30) is configured by a hinge mechanism around which the inner side surface (11A) in the seat width direction of the air distribution plate portion (11) is rotated so as to face the seat surface side as the panel member (10) moves outward in the seat width direction. With such a configuration, the arrangement position, direction or the like of the panel member (10) can be freely adjusted in the seat width direction according to physique differences, air (A) strength or direction preference, or the like of the seated person by the position adjustment mechanism (30).

The panel member (10) is arranged in pairs on both seat side portions, and positions thereof are configured to be synchronously adjusted in a left-right symmetrical manner by the position adjustment mechanism (30). With such a configuration, the air (A) is blown out symmetrically toward the body of the seated person from the left and right sides and the position of the panel member (10) on each side can be simply and collectively adjusted in a symmetrical manner without performing the position adjustment individually.

Further, the panel member (10) includes a facing plate portion (13) which faces the inner side surface (11A) in the seat width direction of the air distribution plate portion (11). With such a configuration, the air (A) flowing along the inner side surface (11A) of the air distribution plate portion (11) of the panel member (10) can spread and flow toward the seat surface side more efficiently by the facing plate portion (13).

The air conditioning seat (1) further includes a heat source (H) which is provided on the facing plate portion (13) and is configured to radiate heat to the outside. With such a configuration, direct heat radiation toward the body of the seated person from the outer side in the seat width direction can be performed by the heat source (H) provided on the facing plate portion (13). Meanwhile, the heat is also radiated to the air (A) flowing between the air distribution plate portion (11) and the heat source (H), and the heat radiation can also be performed by the air (A) blown out from the panel member (10).

The air conditioning seat (1) further includes a storage mechanism (30) which is configured to switch the panel member (10) between a use position (P1) where the panel member (10) projects further than the seat top surface (3A) and a storage position (P2) where the panel member (10) is retracted to a back side of the seat top surface (3A). With such a configuration, the panel member (10) can be retracted to a position so as not to interfere with the seated person when not in use.

Further, the panel member (10) includes a partition (13A) which partitions the flowing of the air (A) along the inner side surface (11A) in the seat width direction of the air distribution plate portion (11). With such a configuration, the air (A) flowing along the inner side surface (11A) of the air distribution plate portion (11) of the panel member (10) can be controlled to spread more appropriately to an aiming direction by the partition (13A).

Second Embodiment

Schematic Configuration of Air Conditioning Seat 1

Figure 6:
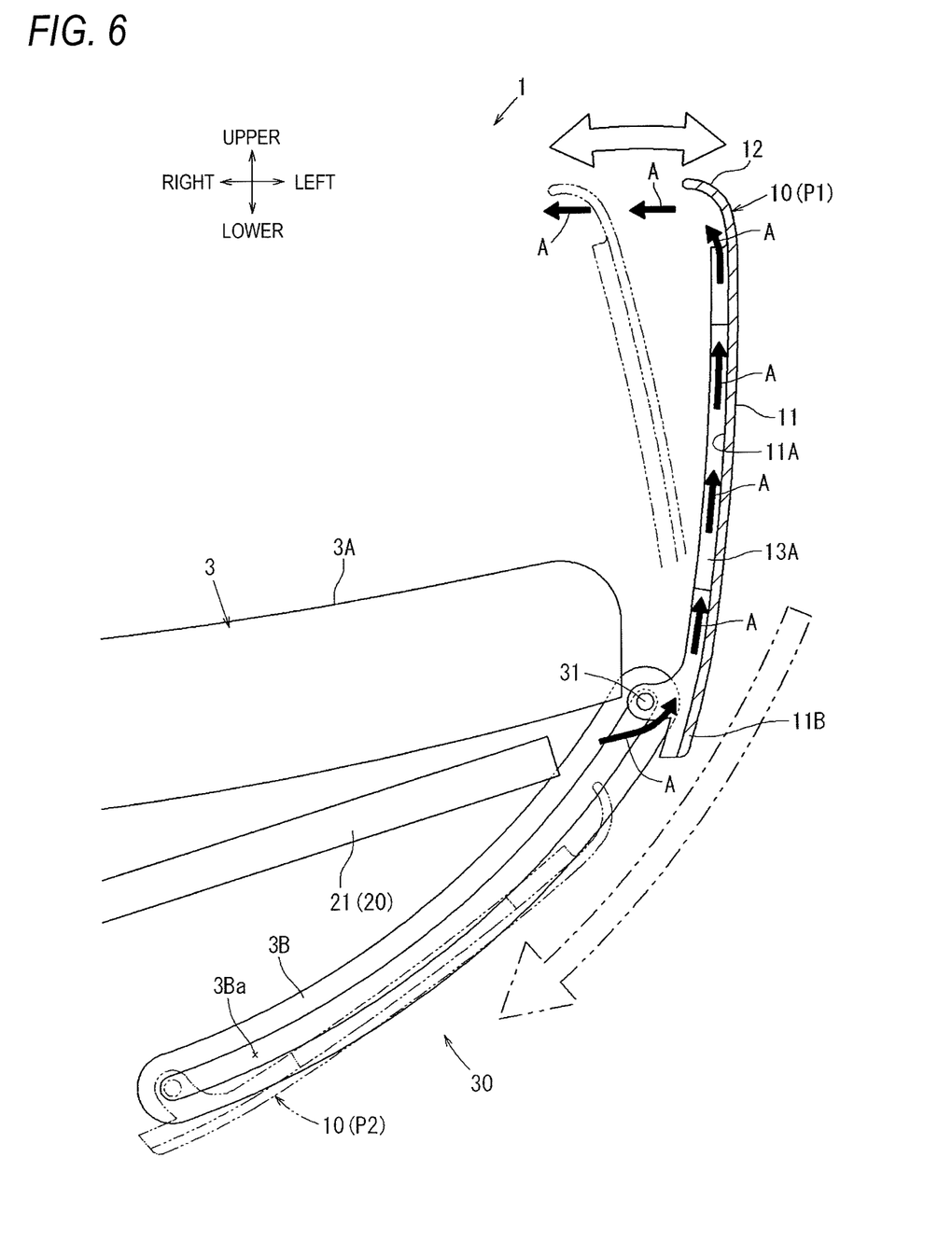
FIG. 6 is a cross-sectional view corresponding to FIG. 2 and shows a schematic configuration of an air conditioning seat according to a second embodiment.

Next, a configuration of the air conditioning seat 1 according to a second embodiment will be described with reference to FIG. 6. In this embodiment, the panel member 10 is configured only by one plate member including the air distribution plate portion 11 and the bent plate portion 12 and does not have a configuration corresponding to the facing plate portion (13) shown in the first embodiment. Even if the panel member 10 has such a configuration, the air A blown against the inner side surface 11A of the extension 11B of the air distribution plate portion 11 from the inner side in the seat width direction can flow upward and widely spread in the seat front-rear direction which is the in-plane direction of the inner side surface 11A, and the flowing air A can be bent inward in the seat width direction from the bent plate portion 12 so as to be discharged.

In a state where the panel member 10 is arranged at the use position P1 thereof, the side surface portions (frame surface portions) on each side of the seat cushion 3 which face the inner side surfaces 11A of the air distribution plate portions 11 function as facing portions, and the air A flowing upward along the inner side surface 11A of the air distribution plate portion 11 is prevented from leaking to the inner side in the seat width direction. Therefore, even with such a configuration, the air A flowing upward along the inner side surface 11A of the air distribution plate portion 11 can flows while appropriately spreading in the seat front-rear direction. Since the configurations other than the above are the same as the configuration shown in the first embodiment, the same reference numerals are given and the description thereof will be omitted.

Third Embodiment

Schematic Configuration of Air Conditioning Seat 1

Figure 7:
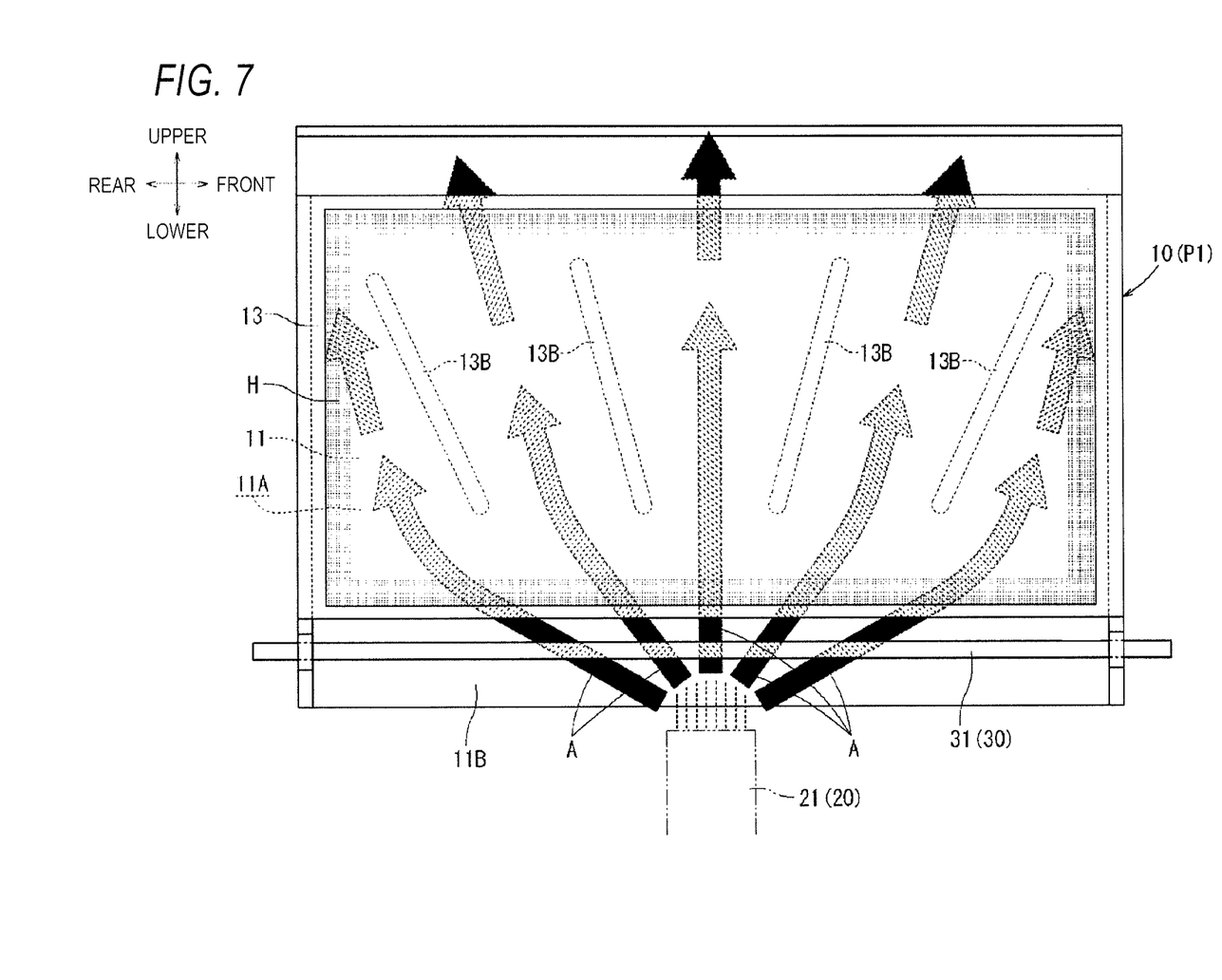
FIG. 7 is a side view showing a schematic configuration of a panel member of an air conditioning seat according to a third embodiment.

Next, a configuration of the air conditioning seat 1 according to a third embodiment will be described with reference to FIG. 7. In the present embodiment, each partition 13B formed on the facing plate portion 13 is formed to protrude in a form of extending radially around a lower position substantially at a center of the seat front-rear direction of the facing plate portion 13. With such a configuration, the air A blown from the duct 21 against the inner side surface 11A of the extension 11B of the air distribution plate portion 11 can widely spread in the seat front-rear direction along a guide shape obtained by extending of each partition 13B.

With the guide of the obliquely forward and upward extending shape of the partitions 13B on the front side, the air A flowing along the inner side surface 11A of the air distribution plate portion 11 can also be guided so as to be blown toward a front side of the air distribution plate portion 11. Therefore, a plate portion shaped to be bent inward in the seat width direction in the same manner as the bent plate portion 12 is also set on a front edge portion of the air distribution plate portion 11, so that the air A flowing forward can be bent inward in the seat width direction from a position in front of a front surface of the seat cushion 3 so as to be discharged. The air A is blown out toward the inner side in the seat width direction from the position in front of the seat cushion 3, that the air A can be blown toward left and right lower thighs of a seated person from both outer sides thereof. Since the configurations other than the above are the same as the configuration shown in the first embodiment, the same reference numerals are given and the description thereof will be omitted.

Fourth Embodiment

Schematic Configuration of Air Conditioning Seat 1

Figure 8:
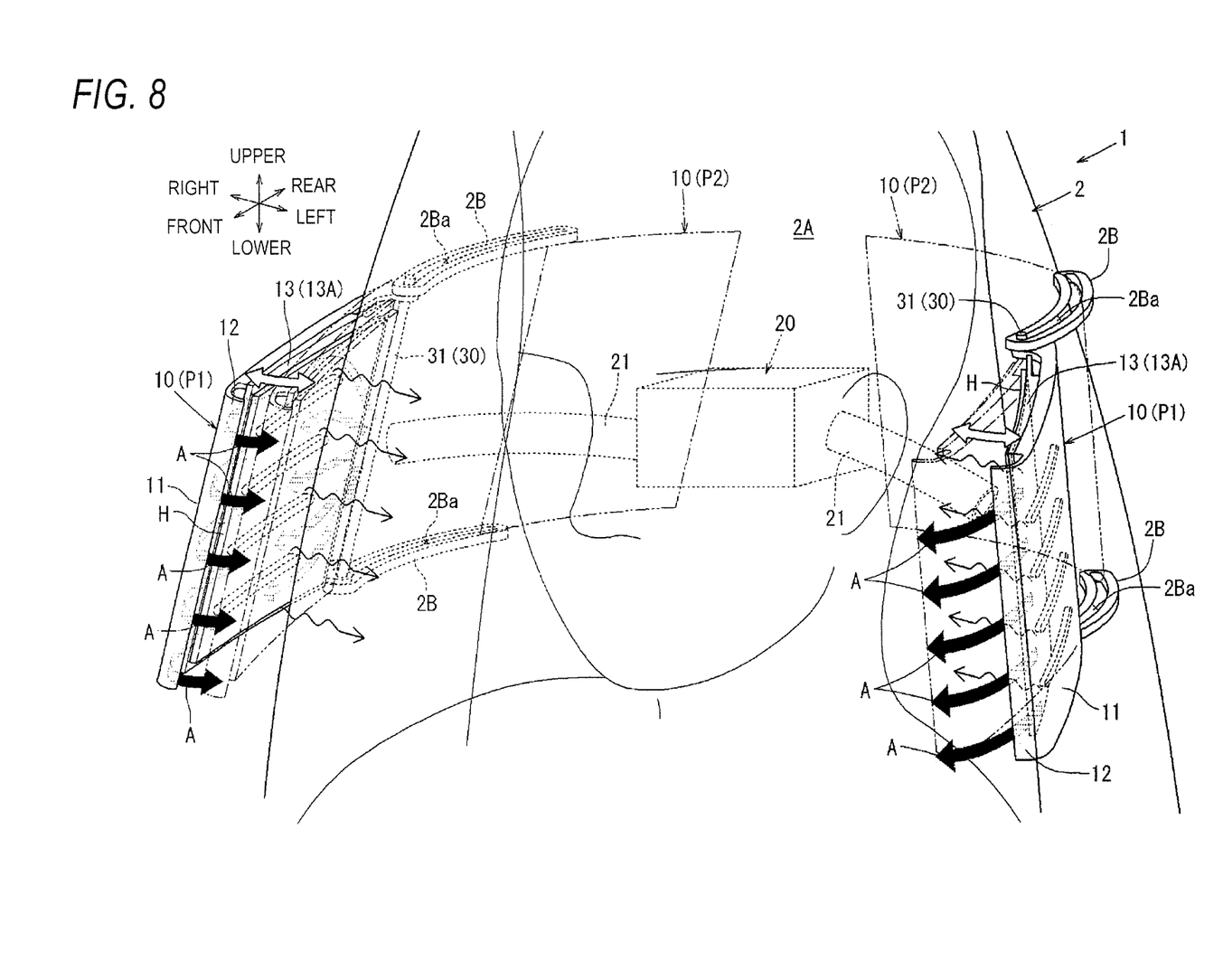
FIG. 8 is a perspective view showing a schematic configuration of an air conditioning seat according to a fourth embodiment.

Next, the configuration of the air conditioning seat 1 according to a fourth embodiment will be described with reference to FIG. 8. In this embodiment, a pair of right and left panel members 10 and the movable mechanism 30 which adjusts a rising angle of the panel members 10 so as to deploy and store the panel members 10 are set for a so-called high back type seat back 2. Specifically, each panel member 10 is configured such that air A sent out from the air conditioning device 20 provided behind the seat back 2 flows toward a seat front side (seat surface side) along the inner side surface 11A in the seat width direction of the air distribution plate portion 11. Further, the air A is guided to be blown out laterally toward the head or chest of a seated person by the bent plate portion 12 that is bent inward in the seat width direction on a front edge side of the panel member 10.

When not in use, each panel member 10 can be moved from the use position P1 where each panel member 10 projects forward of a top surface 2A (seat top surface) of the seat back 2 to a storage position P2 where each panel member 10 is retreated to a rear side of the top surface 2A by the movable mechanism 30. The movable mechanism 30 includes rotation shafts 31 through which each panel member 10 is rotatably and axially coupled to each bracket 2B that extends from each side frame (not shown) of the seat back 2, and a drive unit (not shown) is connected to the rotation shafts 31.

Specifically, each rotation shaft 31 is in a direction of an axis extending straight in the seat height direction, and is integrally connected and attached to each upper and lower end portions of each corresponding panel member 10. Further, each rotation shaft 31 passes through each elongated hole 2Ba, penetratingly formed in each corresponding bracket 2B, in the seat height direction, and is assembled to each bracket 2B such that the position thereof in each elongated hole 2Ba can be slidably adjusted by the drive unit (not shown). Since the basic configuration of each panel member 10 and the movable mechanism 30 are substantially the same as those of corresponding components shown in the first embodiment, the same reference numerals are given to the corresponding components, and the detailed description thereof will be omitted.

Other Embodiments

Although the present disclosure has been described above by using four embodiments, the present disclosure can be implemented in various forms rather than the above embodiments. For example, the air conditioning seat of the present disclosure can be applied to seats of furniture other than vehicles, and can also be widely applied to seats provided for cars such as automobiles and trains, and also for various vehicles such as aircrafts and ships.

The panel member may be set on at least one seat side portion of the air conditioning seat and may not necessarily be set as a pair on both side portions. In a case where the panel member is set on both side portions of the air conditioning seat, the position adjustment mechanism and the storage mechanism may be configured to move the panel members individually without interlocking or simultaneously moving the respective panel members. The position adjustment mechanism and the storage mechanism may be electrically driven by the drive unit or may be moved by manual operation or moved under the urging action of a spring accompanying unlocking thereof.

The bent plate portion of the panel member may be bent at an angle rather than being bent from the air distribution plate portion in a curved shape. The heat source that is provided on the facing plate portion and radiates heat to the outside may be a cooling device rather than the heating device such as the panel heater H or the like. The heat source may be provided to function only to radiate heat toward the body of the seated person, to which the facing plate portion faces from the outer side in the seat width direction, from both outer sides thereof by using a structure capable of controlling heat transfer, such as a heat insulating material. The heat source may be provided such that the released heat is transmitted only to the air mainly flowing between the air distribution plate portion and the heat source, and the heat is radiated to the body of the seated person by the air blown out from the bent plate portion.

Although the partition provided on the panel member is formed to protrude from the facing plate portion, the partition may be formed to protrude from the inner side surface of the air distribution plate portion or formed by a member that is configured separately from the air distribution plate portion and the facing plate portion.

The disclosure provides illustrative, non-limiting examples as follows:

According to a first aspect of the disclosure, there is provided an air conditioning seat including a blowing path through which air is blown out from a seat surface, the blowing path including a panel member, the panel member including: an air distribution plate portion which has a vertical plate shape, extends to project from a seat side portion to a seat surface side, and in which air flows along an inner side surface thereof in a seat width direction, and a bent plate portion which is bent inward in the seat width direction from a part of the air distribution plate portion which projects further than a seat top surface, and which is configured to discharge the air flowing toward the seat surface side along the air distribution plate portion by bending the air inward in the seat width direction.

According to the first aspect of the disclosure, with a simple configuration in which a panel member projecting from the seat side portion is provided, the air flows toward the seat surface side while widely spreading along the inner side surface of the air distribution plate portion of the panel member, and the flowing air can be blown inward in the seat width direction toward a body side of a seated person by the bent plate portion of the panel member.

According to a second aspect of the disclosure, there is provided the air conditioning seat according to the first aspect, further including: a duct which is configured such that air is blown from a position spaced from the inner side surface in the seat width direction of the air distribution plate portion, the air flowing in an out-of-plane direction of the inner side surface against the inner side surface.

According to the second aspect of the disclosure, the air blown from the duct against the inner side surface of the air distribution plate portion flows in an in-plane direction thereof and widely spreads along the inner side surface of the air distribution plate portion. Further, since the duct is not connected to the panel member, a simple configuration in which it is unnecessary to provide a structure that absorbs a change in arrangement position of the panel member with respect to the duct can be obtained.

According to a third aspect of the disclosure, there is provided the air conditioning seat according to the first or second aspect, further including: a position adjustment mechanism configured to adjust an arrangement position of the panel member in the seat width direction with respect to the seat side portion.

According to the third aspect of the disclosure, the arrangement position of the panel member can be freely adjusted in the seat width direction according to physique differences, air strength preference, or the like of the seated person by the position adjustment mechanism.

According to a fourth aspect of the disclosure, there is provided the air conditioning seat according to the third aspect, wherein the position adjustment mechanism is configured by a hinge mechanism around which the inner side surface in the seat width direction of the air distribution plate portion is rotated so as to face the seat surface side as the panel member moves outward in the seat width direction.

According to the fourth aspect of the disclosure, the arrangement position, direction, or the like of the panel member can be freely adjusted in the seat width direction according to physique differences, air strength and direction preference, or the like of the seated person by the position adjustment mechanism.

According to a fifth aspect of the disclosure, there is provided the air conditioning seat according to the third or fourth aspect, wherein the panel member is arranged in pairs on both seat side portions, and positions thereof are configured to be synchronously adjusted in a left-right symmetrical manner by the position adjustment mechanism.

According to the fifth aspect of the disclosure, the air is blown out symmetrically from the left and right sides toward the body of the seated person and the position of the panel member on each side can be simply and collectively adjusted in a symmetrical manner without performing the position adjustment individually.

According to a sixth aspect of the disclosure, there is provided the air conditioning seat according to any one of the first to fifth aspects, wherein the panel member further includes a facing plate portion which faces the inner side surface in the seat width direction of the air distribution plate portion.

According to the sixth aspect of the disclosure, the air flowing along the inner side surface of the air distribution plate portion of the panel member can spread and flow toward the seat surface side more efficiently by the facing plate portion.

According to a seventh aspect of the disclosure, there is provided the air conditioning seat according to the sixth aspect, further including: a heat source which is provided on the facing plate portion and is configured to radiate heat to the outside.

According to the seventh aspect of the disclosure, heat can be directly radiated toward the body of the seated person from the outer side in the seat width direction by the heat source provided on the facing plate portion. Meanwhile, the heat is also radiated to the air flowing between the air distribution plate portion and the heat source, and the heat radiation can also be performed by the air blown out from the panel member.

According to an eighth aspect of the disclosure, there is provided the air conditioning seat according to any one of the first to seventh aspects, further including: a storage mechanism which is configured to switch the panel member between a use position where the panel member projects further than the seat top surface and a storage position where the panel member is retracted to a back side of the seat top surface.

According to the eighth aspect of the disclosure, the panel member can be retracted to a position not to interfere with the seated person when not in use.

According to a ninth aspect of the disclosure, there is provided the air conditioning seat according to any one of the first to eighth aspects, wherein the panel member further includes a partition which partitions flowing of the air along the inner side surface in the seat width direction of the air distribution plate portion.

According to the ninth aspect of the disclosure, the air flowing along the inner side surface of the air distribution plate portion of the panel member can be controlled to spread more appropriately to an aiming direction by the partition.

What is claimed is:

1. An air conditioning seat comprising:
   a blowing path through which air is blown out from a seat surface, the blowing path including a panel member, the panel member including:
   an air distribution plate portion which has a vertical plate shape, extends to project from a seat side portion to a seat top surface, and in which air flows along an inner side surface of the air distribution plate portion, which is inward of the air distribution plate portion in a seat width direction, and
   a bent plate portion which is bent inward in the seat width direction from a part of the air distribution plate portion which projects further than the seat top surface, and which is configured to discharge the air flowing toward the seat top surface along the air distribution plate portion by bending the air inward in the seat width direction,
   the blowing path including a duct fluidly connected with a blowing air source and directing blowing air onto the air distribution plate portion, the duct spaced from the inner side surface in the seat width direction of the air distribution plate portion, and wherein there is no direct structural connection between the duct and the panel member, the air flowing in an out-of-plane direction relative to a plane defined by the inner side surface and against the inner side surface.

2. The air conditioning seat according to claim 1, further comprising:
   a position adjustment mechanism configured to adjust an arrangement position of the panel member in the seat width direction with respect to the seat side portion.

3. The air conditioning seat according to claim 2, wherein the position adjustment mechanism is configured by a hinge mechanism around which the inner side surface in the seat width direction of the air distribution plate portion is rotated.

4. The air conditioning seat according to claim 2, wherein the panel member is arranged in pairs on both seat side portions, and positions thereof are left-right symmetrical.

5. The air conditioning seat according to claim 1, wherein the panel member further includes a facing plate portion which faces the inner side surface in the seat width direction of the air distribution plate portion.

6. The air conditioning seat according to claim 5, further comprising:
   a heat source which is provided on the facing plate portion and is configured to radiate heat to an inside in a seat width direction.

7. The air conditioning seat according to claim 1, further comprising:
a storage mechanism which is configured to switch the panel member between a use position where the panel member projects further than the seat top surface and a storage position where the panel member is retracted to a back side of the seat top surface.

8. The air conditioning seat according to claim 1,
wherein the panel member further includes a partition which partitions flowing of the air along the inner side surface in the seat width direction of the air distribution plate portion.

\* \* \* \* \*